United States Patent [19]

Bastiaens et al.

[11] Patent Number: 5,473,660
[45] Date of Patent: Dec. 5, 1995

[54] IMAGE SENSING DEVICE

[75] Inventors: Raoul J. M. H. Bastiaens; Paulus H. F. M. Van Twist, both of Eindhoven, Netherlands

[73] Assignee: U.S. Philips Corporation, New York, N.Y.

[21] Appl. No.: 252,505

[22] Filed: Jun. 1, 1994

[51] Int. Cl.[6] .......................... H04N 5/335; H04N 5/325
[52] U.S. Cl. ...................... 378/98.8; 378/98.7; 348/241; 348/250
[58] Field of Search ........................ 378/98, 90.3, 98.7, 378/98.8; 348/241, 243, 250, 251, 607, 615

[56] References Cited

U.S. PATENT DOCUMENTS

| | | | |
|---|---|---|---|
| 4,454,435 | 6/1984 | Burns | 307/530 |
| 4,455,574 | 6/1984 | Hashimoto et al. | 348/257 |
| 4,559,559 | 12/1985 | Hashimoto et al. | 348/607 |
| 4,675,738 | 6/1987 | Okino et al. | 348/243 |
| 4,683,580 | 7/1987 | Matsunaga | 377/60 |
| 5,216,509 | 6/1993 | Hirasawa | 348/241 |
| 5,267,028 | 11/1993 | Suga et al. | 348/223 |

Primary Examiner—David P. Porta
Attorney, Agent, or Firm—Jack D. Slobod

[57] ABSTRACT

An image sensing device is provided with an image sensor having one or more radiation-sensitive elements which convert incident radiation into collected charges. A read-out circuit converts the collected charges into pixel signals which contain a hold level and an image level, the hold level providing a comparison voltage and the image level being representative of a charge quantity. The hold level is formed by coupling the read-out circuit temporarily to a comparison voltage; this coupling is done by closing a transistor which adds thermal noise to the pixel signal. The image sensing device comprises a signal processing circuit which comprises a clamp circuit which makes hold-levels of different pixel signals substantially equal. The image level of each pixel signal is offset by the same amount as its hold level. An electronic image signal is formed as a result of integration of the image level in respect of the clamped hold level. The noise component of the resulting electronic image signal is substantially reduced because the noise of the hold level is decreased and the high-frequency noise component of the image level is substantially averaged-out. Since only the image level is integrated a rapid processing of the pixel signal into an electronic image signal is accomplished and hence the image sensing device according to the invention is able to process consecutive images at a high rate.

7 Claims, 2 Drawing Sheets

IMAGE SENSING DEVICE

BACKGROUND OF THE INVENTION

1. Field of the Invention

The invention relates to an image sensing device comprising a solid-state image sensor with at least one radiation sensitive element to convert incident radiation into an electric charge, a read-out circuit to form a pixel signal from the electric charge, which pixel signal includes at least a hold level and an image level while the image sensing device comprises a signal processing circuit to determine a difference signal representative of the difference between the hold level and the image level and to derive an electronic image signal from the difference signal. The invention also relates to an x-ray examination apparatus which comprises an image sensing device with a solid-state image sensor.

2. Description of the Related Art

An image sensor of said kind is known from the U.S. Pat. No. 4,454,435.

The signal processing circuit of the known image sensor is arranged so as to form an electronic image signal from the pixel signal by sampling a brief sample portion of the hold level and another brief sample-portion of the image level. The electronic image signal representative of the pixel-value of the pixel in question is derived from a difference signal representing the difference between said sample portions. The electronic image signals of respective pixels are further amplified and combined to form an electronic video signal which is applied to an output circuit, which has the form of an output pad. Consecutive pixel signals which relate to different pixels of an image are separated by a reset-pulse at the start of each pixel signal. The reset-pulse is caused by cross-talk via parasitic capacitances when the gate of a reset transistor is switched to clear the read-out circuit before an electric charge is read-out, a comparison voltage being applied to its source contact, and the drain contact being connected to the output gate of the read-out circuit which supplies the electric charges. Both sample-portions contain the same noise contribution which is induced by the switching on of the reset transistor. Therefore, although the reset transistor produces thermal noise, the thermal noise component of the electronic image signal is partly reduced. Since only brief sample-portions are employed for the formation of the difference of these sample portions, the resulting electronic image signal will still contain a substantial amount of noise. Moreover, variations of residual charges in the read-out circuit may also add noise to the difference signal. As a consequence, the known image sensor is not suitable for recording incident radiation of low intensity. The electronic image signal formed by the known image sensor when an image of low intensity is recorded will have a signal-to-noise ratio which is not sufficient to discern relevant details in the recorded image.

In x-ray examination procedures especially, insufficiency of the signal-to-noise ratio of the electronic image signal is a serious drawback. Since x-rays are to some degree harmful to human tissue it is desirable to reduce the x-ray intensity as much as possible; the luminous intensity of a visible light image derived from an x-ray image is lowered correspondingly. When such a light image is recorded by the known image sensor, the resulting electronic image signal would have a signal-to-noise ratio which is insufficient for forming on a monitor or on a hard copy an image which has an adequate image quality for a physician to make a diagnosis.

SUMMARY OF THE INVENTION

The invention has for its object, inter alia, to provide an image sensing device which reduces the noise component of the electronic image signal and which forms electronic image signals for consecutive images at a relatively high rate.

To achieve this object, an image sensing device according to the invention is characterized in that the signal processing circuit comprises a clamping circuit to relate the pixel signal to a reference level.

The image sensing device according to the invention comprises a solid-state image sensor with at least one radiation-sensitive element. Each radiation-sensitive element converts incident radiation into an electric charge of which the charge quantity corresponds to the intensity of the incident radiation. The read-out circuit converts the electric charge into a voltage variation which is employed as a pixel signal. The pixel signal which is formed by the read-out circuit includes a hold level which constitutes a comparison voltage and an image level which is representative of the relevant charge quantity. The hold level is formed by coupling the read-out circuit temporarily to a comparison voltage source. The signal processing circuit is arranged so as to form an electronic image signal from the pixel signals. To this end, the signal processing circuit determines the difference between the image level and the hold level of each of the pixel signals in order to form the difference signal. The hold levels of different pixel signals may fluctuate somewhat, because thermal noise of the reset transistor and variation of residual charges in the read-out circuit cause noise in the voltage variation. The signal processing circuit is arranged so as to reduce the noise components of the electronic image. A clamp circuit is provided which relates each pixel signal to a predetermined stable reference potential so that fluctuations of hold levels of different pixel signals are eliminated and consequently such fluctuations are not passed on to the difference signal from which the electronic image signal is derived.

A preferred embodiment of an image sensing device according to the invention is characterized in that the clamping circuit comprises an offsetting circuit to set the hold-level of the pixel signal to the reference level.

A relation of the pixel signal to a stable reference level is established by adding or subtracting a DC voltage to or from the pixel signal to set the hold-level substantially equal to the stable reference level. To clamp each pixel signal to the stable reference potential the DC voltages which are added to or subtracted from respective pixel signals may be different. In this way the pixel signal is clamped to the stable reference level while the shape of the pixel signal is retained so that the information content of the pixel signal, carded by the image level relative to the hold level, is not affected. The addition of a DC voltage to the pixel signal may be performed in a comparatively short time, e.g. by the closing of a switch for the duration of the supply of the hold portion to the clamp circuit. The clamping of the pixel signal also removes low-frequency noise components from the hold level because the clamp circuit will follow slow variations of the hold level.

A further preferred embodiment of an image sensing device according to the invention is characterized in that the clamp circuit comprises a low-pass filter to supply a low-frequency component of the hold level to the offsetting circuit.

A high-frequency noise component of the pixel signal is reduced by applying the hold level to a low-pass filter so as to reduce the noise contribution of the hold level. Hence, the noise component of the resulting electronic image signal is also reduced. Image information is contained in the image level. Since the low-pass filter is applied only to the hold level of the pixel signal which does not contain image information, the image information of the pixel signal is not adversely affected.

A further preferred embodiment of an image sensing device according to the invention is characterized in that the signal processing circuit comprises an integrator for averaging the difference.

The image level of each pixel signal contains image information of a pixel of the sensed image. The image information is represented by the integral of the difference between the image level and the hold level, and this integral is representative of the charge collected at the relevant radiation sensitive element of the image sensor. The integrator forms the difference signal as a time-average of the instantaneous difference between the image level and the hold level. Since the integration averages-out fluctuations of the image level, the noise component of the difference signal is substantially reduced. Notably, fluctuations which are first within the time-scale of the duration of the pixel signal are averaged-out and accordingly the high-frequency noise component of the image level is not carried over the difference signal. Integration of a signal is a relatively time consuming operation. The image sensing device according to the invention, however, applies the integration only to the image level of each of the pixel signals, so that the time required by the signal processing circuit for the formation of the difference signal and consequently of the electronic image signal is comparatively short, for example as compared with the performance of separate integrations of all portions of the pixel signal.

It is another object of the invention to provide an x-ray examination apparatus which comprises an image sensing device for producing an electronic image signal of which the noise is reduced when the x-ray dose is decreased and/or when a succession of x-ray images is made at a comparatively high rate.

An x-ray examination apparatus comprising an x-ray source for irradiating an object so as to form an x-ray image on an x-ray image intensifier facing the x-ray source is preferably provided with an image sensing device comprising a solid-state image sensor with at least one radiation sensitive element to convert incident radiation into an electric charge, a read-out circuit to form a pixel signal from the electric charge, which pixel signal includes at least a hold level and an image level while the image sensor comprises a signal processing circuit to determine the difference between the hold level and the image level and to derive an electronic image signal from the difference, and preferably incorporates the signal processing circuit which comprises a clamping circuit to relate the pixel signal to a reference level.

The x-ray examination apparatus according to the invention comprises an image sensing device which reduces noise of the electronic image signal. Hence, a sufficient image quality can be maintained when the x-ray dose is decreased. The image sensing device forms the electronic image at a relatively high rate. Hence, x-ray examination apparatus according to the invention is capable of generating a succession of x-ray images and of converting them into a succession of electronic image signals at a relatively high rate.

These and other aspects of the invention will become apparent from and elucidated with reference to the embodiments described hereinafter and with reference to the accompanying drawings.

DETAILED DESCRIPTION OF THE PREFERRED EMBODIMENTS

Figure 1:
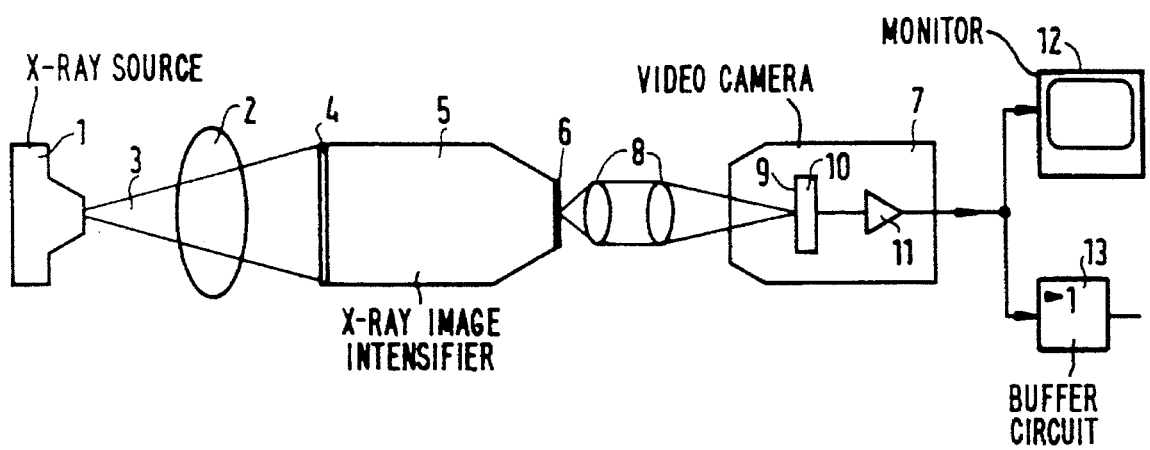
FIG. 1 is a diagram of an x-ray examination apparatus comprising an image sensing device according to the invention.

FIG. 1 is a diagram of an x-ray examination apparatus comprising an image sensor according to the invention. An x-ray source 1 irradiates an object 2, e.g. a patient who is to be examined, with an x-ray beam 3 so that an x-ray image is formed on the entrance screen 4 of an x-ray image intensifier 5. The x-ray image intensifier 5 converts the x-ray image into a visible light image of increased brightness at the output window 6 of the x-ray image intensifier. The visible light image is detected by a video camera 7 which derives an electronic video signal from the visible light image. The image-carrying visible radiation which is emitted by the output window 6 is imaged by an optical arrangement 8 on the light sensitive face 9 of an image sensing device 10 which is incorporated in the video camera 7. The image sensing device 10 forms for each of the pixels of the image an electronic image signal which is applied to an amplifier 11 The electronic image signals for each of the pixels are amplified by the amplifier 11 and are combined to form an electronic video signal which may either be applied to a monitor 12 for viewing or to a buffer-circuit 13. The electronic video signal may be supplied from the buffer-circuit 13 to undergo further electronic processing steps.

Figure 2:
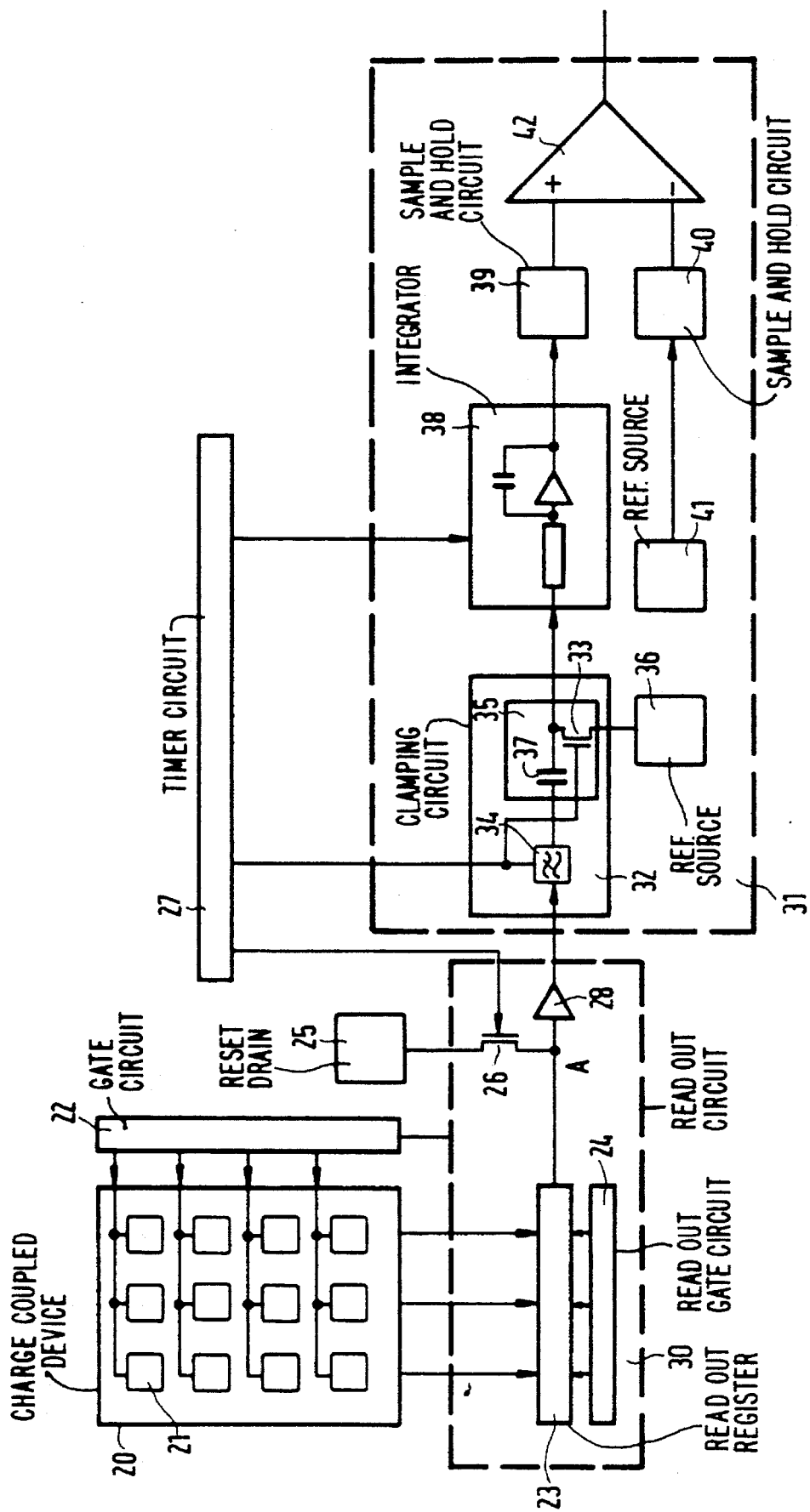
FIG. 2 is a diagram of an image sensing device according to the invention.

FIG. 2 is a diagram of an image sensing device according to the invention. The image sensing device 10 comprises a charge-coupled device 20 i.e. a solid state image sensor having a multitude of light-sensitive semiconductor elements which converts incident image-carrying radiation into charge packets. The charge packets constitute an electronic image which is derived from the visible light image; at each light-sensitive element of the image sensor the quantity of the collected charge corresponds to the brightness-value of the corresponding position in the visible light image. Each light-sensitive element comprises a gate-contact 21. When an image is sensed, a voltage of the opposite polarity to the polarity of the collected charges is applied to the gate-contacts 21, which are controlled by a gate-circuit 22. After an image has been sensed by the charge-coupled device the collected charges are read-out in a bucket-brigade fashion controlled by the gate-circuit 22 to a read-out register 23.

Then the collected charges are transferred from the read-out register to a node A. To this end, the read-out register is coupled to a read-out gate-circuit 24 which reads out the read-out register to the node A in a bucket-brigade fashion. In this output scheme the node is preset to a predetermined DC voltage which is applied by a reset-drain 25 via a reset-transistor 26 which is rendered conductive during application of a voltage pulse to the gate of the reset-transistor 26. The reset-transistor 26 is then turned off and after a brief period of time the collected charge is dumped to the capacitance of the node when the voltages of the gate-contacts 21 next to the read-out register 23 go low. The gate of the reset-transistor 26 and the read-out gate circuit are controlled by a timer-circuit 27. The read-out register 23, the read-out gate circuit 24, the reset-transistor 26 and the node A form the read-out-circuit 30 of the charge coupled device 20. The voltage variations at the node are supplied to a read-out amplifier 28 which forms pixel signals which are supplied to a further processing circuit 31.

Figure 3:
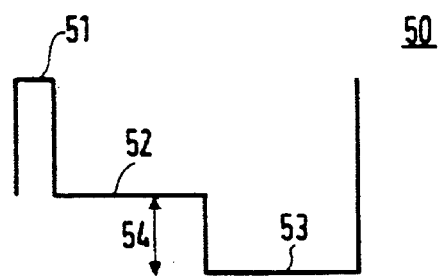
FIG. 3 is a diagrammatic representation of the waveform of an electronic signal for a single pixel.

FIG. 3 is a diagrammatic representation of the waveform 50 of the voltage variation which constitutes a pixel signal supplied by the read-out amplifier 28. This pixel signal for each pixel contains a reset-pulse 51 which is coincident with the voltage pulse supplied to the reset-transistor 26 and is caused by coupling of the voltage pulse which is supplied by the timer-circuit 27 to switch the reset-transistor 26 to the node via parasitic capacitances. Further, the pixel signal contains a hold;level 52, which is formed during the brief period of time between turning off of the reset-transistor 26 and dumping of the collected charge to the node A and contains an image-level 53, the difference 54 between the hold level and the image level being representative for the charge of the relevant pixel. The node A may not be preset to the same level for different pixel signals because thermal noise of the reset- transistor 26 induces noise in the voltage variations at node A. The node A has a comparatively small capacitance to achieve sensitivity to voltage variations owing to the collected charges, which amount to small quantities. As a consequence, the node A is also sensitive to thermal noise of the reset-transistor. Hence, differences between hold-levels of pixel signals may occur which give rise to noise if no measures are taken. Moreover, after the reset-transistor 26 has been turned off, part of a charge previously transferred to the node A may remain as a residual charge on the node A. This residual charge may vary as a function of the previously transferred charge.

The further processing of the pixel signals into an electronic image signal is now discussed with reference to FIG. 2. The pixel signals are supplied to a switchable clamping circuit 32. The clamping circuit 32 is controlled by the timer-circuit 27 so as to activate the clamping circuit 32 while the hold:level 52 of each pixel signal is supplied to the clamping circuit 32. The timer circuit 27 supplies an activation pulse to activate a low-pass filter 34 while the hold level is supplied to the clamping circuit 32. The timer circuit 27 supplies the activation pulse also to the switch 33. As a result, the switch 33 is closed as long as the activation pulse is applied to the switch. The switch 33 is opened when the activation pulse is turned off by the timer circuit 27. The clamp circuit further incorporates an offsetting-circuit 35, which supplies a DC signal to each pixel signal so as to make the hold-level of each pixel signal substantially equal to a reference voltage. The reference voltage is supplied to the clamping circuit 32 by a reference source 36. The offsetting-circuit 35 comprises a capacitor 37 which is coupled to the reference source 36 by the switch 33. The switch 33 is closed during the supply of the hold level of each pixel signal to the offsetting-circuit so that the voltage across the capacitor 37 is made substantially equal to the reference voltage and hence the hold-level is set equal to the reference voltage. After the clamping of the hold level, the switch 33 is opened and the voltage at the capacitor 37 remains, the image level of each pixel signal is offset by the same amount as its hold-level. The low-pass filter 34 removes a high-frequency noise component from the hold-level of each pixel signal. The offsetting-circuit 35 will follow a low-frequency noise component of the hold-level as it makes the hold-level substantially equal to the reference value. The clamping circuit supplies clamped pixel signals which have a hold level that is substantially free from noise and has a voltage level which is substantially the same for each clamped pixel signal. The low-pass filter may be integrated with the off-setting circuit by coupling a resistance in series with the capacitor 37. This low-pass filter is activated by closing of the switch 33, which has for example the form of a transistor which is controlled by the timer-circuit 27. When the resistance of the switch transistor which forms switch 33 is made low the offsetting circuit also performs the function of a low-pass filter and hence the node A is in fact coupled to a low-pass filter 34 of the clamping circuit 32 during the supply of the hold-portion of each pixel signal. The voltage variations which are transferred to the capacitor 37 from the thermal noise of the switch 33 are made negligible because the capacitor 37 has a comparatively large capacitance.

Each clamped pixel signal is applied to an integrator 38. The integrator 38 is controlled by the timer-circuit 27. The integrator 38 determines the difference signal as the time average of the instantaneous difference between the image-level and the hold-level of the clamped pixel signal. The timer-circuit 27 supplies a control pulse to the integrator 38 to activate the integrator 38 as long as the image level of each clamped pixel signal is applied to the integrator 38. The integrator 38 supplies the difference signal having the form of an averaged difference between the image level signal and the hold level of each clamped pixel signal.

The difference signal is supplied to a first sample-and-hold-circuit 39 which supplies a sampled difference signal. A second sample-and-hold-circuit 39 is provided which is a closely resembling copy of the first sample-and-hold-circuit 38 and which samples a reference signal from a reference source 41. The sampled reference signal is subtracted by means of a differential amplifier 42 from the sampled difference signal in order to reduce perturbations induced in the sampled difference signal by cross-talk of switching pulses supplied to transistors of the sample-and-hold-circuit 39 into the difference signal of sampling pulses of the sample-and-hold-circuit 39. The copy sample-and-hold circuit 40 produces perturbations which are substantially equal to the perturbations caused by the first sample-and-hold circuit 39. The differential amplifier 42 produces the electronic image signal in which noise is reduced because perturbations from both sample-and-hold circuits are to a large extent mutually cancelled out.

We claim:

1. An image sensing device comprising a solid-state image sensor with at least one radiation-sensitive element to convert incident radiation into an electric charge, a read-out circuit to form a pixel signal from the electric charge, which pixel signal includes at least a hold level and an image level while the image sensing device comprises a signal processing circuit to determine the difference between the hold level and the image level and to derive an electronic image signal from the difference, characterized in that the signal processing circuit comprises a clamping circuit including a low-pass filter to relate a low-pass filtered hold level of the pixel signal to a reference level.

2. An image sensing device as claimed in claim 1, characterized in that the clamping circuit comprises an offsetting circuit to set the low-pass filtered hold level of the pixel signal to the reference level.

3. An x-ray examination apparatus comprising an x-ray source to irradiate an object so as to form an x-ray image on an x-ray image intensifier facing the x-ray source, characterized in that the x-ray examination apparatus is provided with an image sensing device as claimed in claim 2 to convert a visible light image derived from the x-ray image by the x-ray image intensifier into an electronic image signal.

4. An image sensing device as claimed in claim 1, characterized in that the signal processing circuit comprises an integrator for averaging the difference.

5. An x-ray examination apparatus comprising an x-ray source to irradiate an object so as to form an x-ray image on an x-ray image intensifier facing the x-ray source, characterized in that the x-ray examination apparatus is provided with an image sensing device as claimed in claim 1 to convert a visible light image derived from the x-ray image by the x-ray image intensifier into an electronic image signal.

6. An x-ray examination apparatus comprising an x-ray source to irradiate an object so as to form an x-ray image on an x-ray image intensifier facing the x-ray source, characterized in that the x-ray examination apparatus is provided with an image sensing device as claimed in claim 4 to convert a visible light image derived from the x-ray image by the x-ray image intensifier into an electronic image signal.

7. An image sensing device as claimed in claim 2, characterized in that the signal processing circuit comprises an integrator for averaging the difference.

* * * * *